No. 785,637.

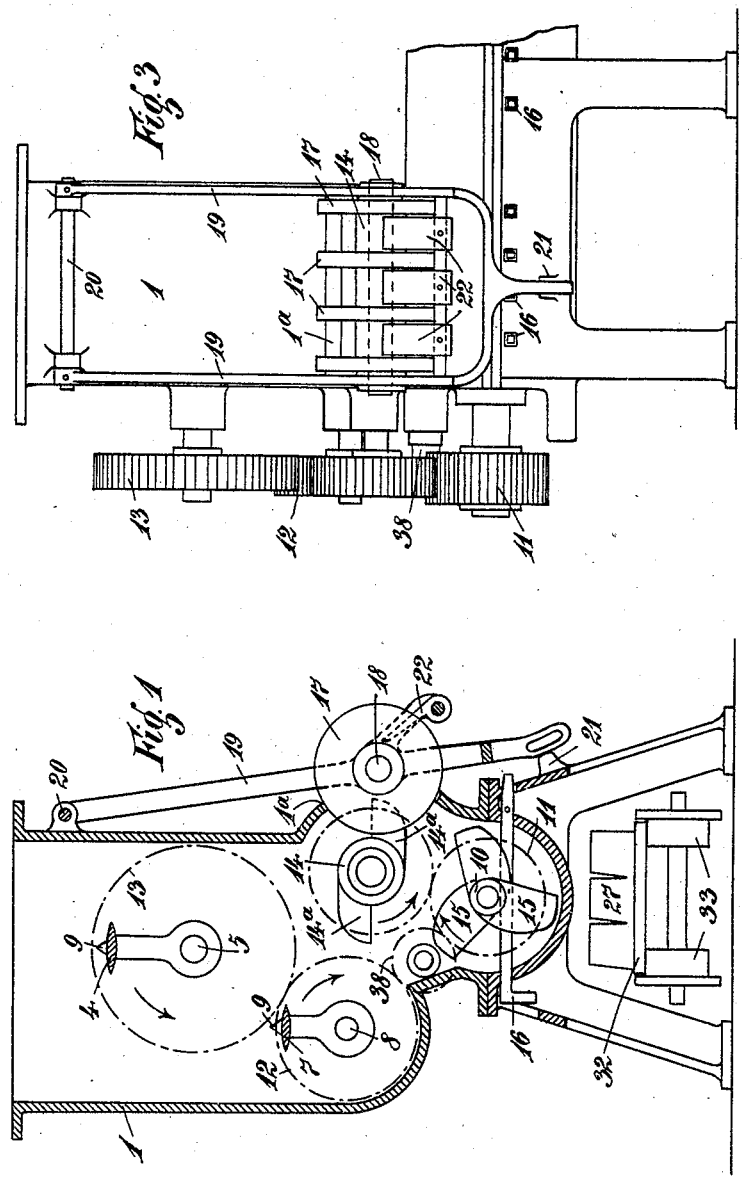

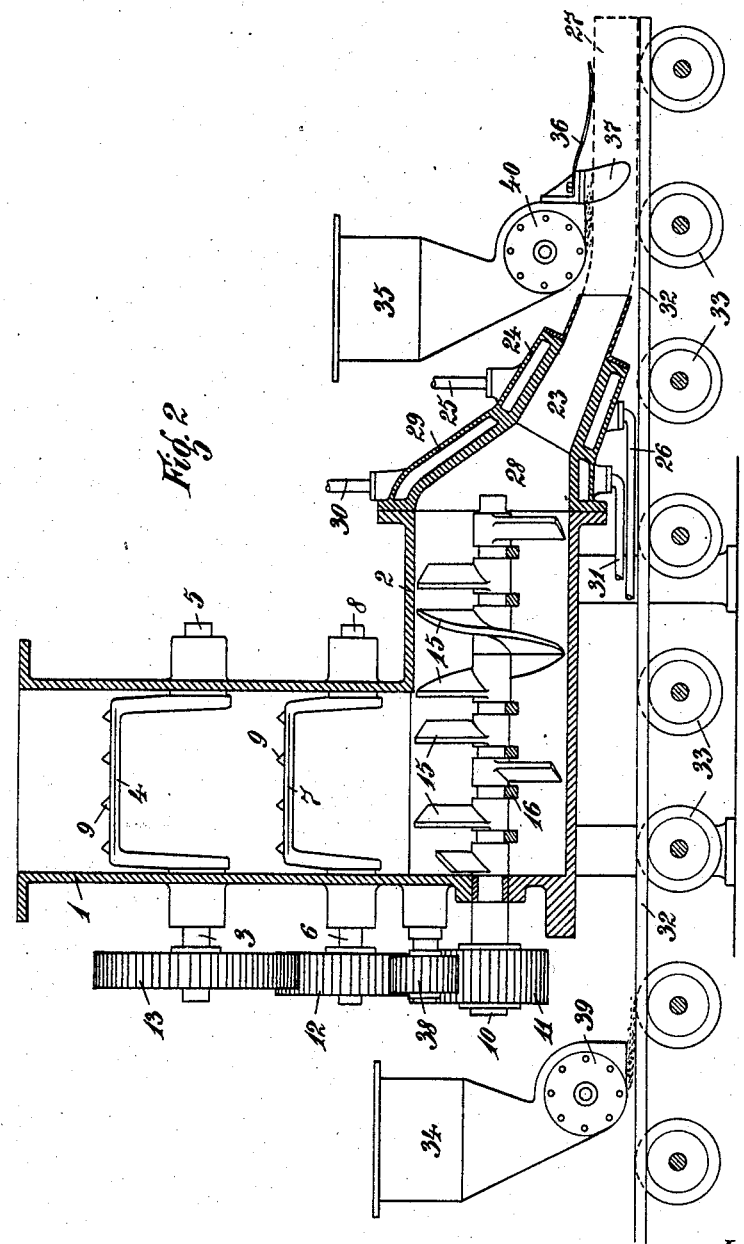

Patented March 21, 1905.

UNITED STATES PATENT OFFICE.

CARL SCHLICKEYSEN, OF STEGLITZ, GERMANY.

PEAT-COMPRESSING MACHINE.

SPECIFICATION forming part of Letters Patent No. 785,637, dated March 21, 1905.

Application filed October 7, 1903. Serial No. 176,107.

*To all whom it may concern:*

Be it known that I, CARL SCHLICKEYSEN, manufacturer, a subject of the King of Prussia, German Emperor, residing at No. 6 Friedrichstrasse, Steglitz, near Berlin, in the Kingdom of Prussia, German Empire, have invented certain new and useful Improvements in Peat-Compressing Machines, of which the following is a specification.

The native peat as obtained from the soil forms generally big, irregular, and coherent pieces of widely-different composition. There are in the native peat besides the decomposed or decayed pieces also undecayed or undecomposed pieces consisting of a crisscross of soft fibers, reed-grass, and half-rotten roots. The fibers and the reed-grass contain water, which in its turn contains organic adhesive substances which might well be employed for holding together the particles of peat after the native peat has been changed into a homogeneous pulp. For that purpose, however, the water contained in the fibers and the reed-grass must be freed, so that a certain part of it can evaporate, while the adhesive substances remain or are retained in the peat-pulp and are distributed within the same. It is thus important to have the native peat as obtained from the soil changed into a homogeneous pulp allowing of being afterward formed into bars, which then are cut into sods. To attain this end, the peat must be worked upon by a number of means operating partly consecutively partly at a time—namely, means for separating portions of peat from the peat mass introduced into the upper end of the hopper and for removing or scraping off the native peat from the walls of the feed-hopper of the machine; means for forcing the peat into the space below the feed-hopper, where it is further worked upon; means for kneading and compressing the peat; means for tearing and comminuting the undecayed or undecomposed vegetable parts of the peat; means for regulating the pressure which the peat is exposed to inside the machine; means for converting the peat-pulp into a bar or bars; means for heating the mouthpiece of the machine and preferably, also, for heating the peat-pulp preliminarily before entering the mouthpiece; means for transporting the peat bar or bars; means for strewing particles of dry substances—such as sawdust, dust-coal, peat-dust, and the like—upon the transporting means for the bar or bars; means for strewing a substance or substances of the kind aforementioned upon the bar or bars while being transported, and means for pressing the particles in question against or into the surfaces of the bar or bars to which they adhere. As to strewing the transporting means for the bars and the bars themselves with the small particles of dry substances, the intention is that the sods cut from the bars may be easily taken off the transporting means and piled up instantly thereafter. This is made possible by providing the peat bars by the means mentioned with a rather hard and dry surface instantly after leaving the mouthpiece of the machine, so that they get a greater resistibility, which allows of their being piled up.

In order to make my invention more clear, I refer to the accompanying drawings, in which similar reference-numbers denote similar parts, and in which—

Figure 1 is a vertical cross-section through the machine. Fig. 2 is a longitudinal section through the same, and Fig. 3 is a front view of the device for regulating the pressure of the peat inside the machine.

The pieces of the native peat are thrown into the feed-hopper 1, which communicates at its lower end with the cylinder 2. The closed part of this cylinder is the part wherein the peat is compressed, whereas in the other part, which is open at its upper side, the peat is transformed into a homogeneous pulp. Now the large irregular pieces of the native peat tend to clog up the feed-hopper, so that the peat does not feed properly and cannot then get down into the cylinder 2. To prevent this, the feed-hopper contains at least one or, what is preferred, several rotary tools, such as formed by the bent or crooked shafts 3 4 5 and 6 7 8, the bow-shaped part of which when rotating separates portions of peat from the peat mass lying in the mouth of the hopper and, moreover, comes in close proximity to at least one of the walls of the feed-hopper and causes the peat that may adhere to that wall to leave the same, so as to drop into the lower part of the feed-hopper, where it is further acted on by the tool or tools therein contained. I have found it advantageous to provide the operative parts 4 and 7 of the bent or crooked shafts with pointed projections 9 or the like, adapted to take into, and thus to grasp, the pieces of the peat. The configuration of said parts 4 or 7 depends on the sectional shape of the feed-hopper, which may be quadrangular, oval, or circular. In the latter two cases the parts 4 and 7 of the shafts would not be shaped as shown in the drawings, but would be curved nearly or entirely according to the curvature of a circle. The direction of rotation of the shafts 3 4 5 and 6 7 8 is in the example shown contrary one to the other. They are provided with cog-wheels 12 and 13, which gear with each other. Below said shafts is another shaft, 10, which extends longitudinally through the cylinder 2 and has a cog-wheel 11 driving the cog-wheel 12 by the mediation of a pinion 38, so that the cog-wheels 10 and 12 rotate in the same direction. The cog-wheel 11 is further in gear with another cog-wheel, 14, the shaft of which carries a roller 14, having nose-like projections $14^a$, adapted to force the peat down into the cylinder 2, and thus to the tools secured to the main shaft 10 of the machine. Said tools are the usual knives and wings 15, which in the case shown coöperate with bars 16, extending horizontally across the cylinder 2. The bars 16 are located immediately below the shaft 10 and pass through annular grooves provided in the sleeve-like hubs of the knives 15. The fibers, the reed-grass, and the roots and the like contained in the peat are forced by the knives 15 through between the bars 16, and as this occurs continually the said vegetable pieces or parts are comminuted and turned into a uniform mass; but a certain precomminution has already taken place between the nose-roller 14 and the knives 15, because the noses pass through between the knives and these pass through between the noses, since there are interstices of suitable size between the noses as well as between the knives.

If there are in the native peat rather hard pieces, it may occur that the roller 14 forces down into the cylinder 2 more peat than can be worked upon in this cylinder by the knives and wings 15. This is very disadvantageous for the proper working of the machine, as well as for the product of the same, and to prevent such drawbacks I have provided an automatic regulating device, consisting of a number of disks 17, located upon a common axle 18, held by a frame 19. This frame is suspended at 20 from the upper part of the feed-hopper 1 and is held in an oblique position by means of a projection 21 or the like, provided at the lower end of the machine.

The pivots 20 may be made adjustable, so that the pressure resulting from the oblique position of the disks 17 may be changed, and also the projection 21 may be adjustable, so that also by this means a change in the degree of inclination of the frame 19 with its disks 17 may be brought about. These disks are rotary, either singly or all at once, and take into the lower part of the feed-hopper 1 through a sufficiently large aperture $1^a$ of the same in such a way that they take into the interstices between the noses of the roller 14, so that these noses coöperate with the disks 17 somewhat similar to the manner of their coöperation with the knives 15. The distance between the neighboring parts of the disks 17 and the noses of the roller 14 is so small that that portion of the peat which the noses take round while rotating or revolving produces a rotary movement of the disks 17, the direction of this rotation being, of course, contrary to that of the nose-roller 14. The peat thus transported upward by the roller 14 is partly transported outward by the disks 17, from which the peat is taken off by scrapers 22, also held by the frame 19. If, however, the hardness of certain parts of the peat and the number of these parts is so great that the regulation of pressure as brought about by the disks 17 is not sufficient, the frame 19, with the disks 17, yields or gives way, so that the aperture $1^a$ is, in a sense, correspondingly enlarged, and the excess of peat can consequently leave the feed-hopper more easily and directly.

While the peat has been treated first by the shaft 3 4 5, then by the shaft 6 7 8, as well as by the coöperation of said two shafts, further by the nose-roller 14, as well as by the coöperation of this roller with the shaft 6 7 8, thereupon by the coöperation of the nose-roller with the knives 15, and finally by the coöperation of the knives with the bars 16, the fibers, the reed-grass, and the roots have been completely comminuted and the whole peat mass has been turned into a homogeneous pulp, so that the water formerly contained in the fibers and the reed-grass has been freed and become distributed within the peat mass, so that also the adhesive substances dissolved in the water are distributed in the peat. It is now necessary to cause a part of the water contained in the peat mass to evaporate, and for this purpose the mouthpiece 23 of the machine is furnished with a jacket 24, communicating with pipes 25 and 26, by means of which steam, hot air, or hot water may be conducted through the jacket, so that the mouthpiece may be correspondingly heated. Owing to this heating the exterior particles of the peat are also heated while the peat passes through the mouthpiece and is transformed into a bar or bars by the same. In some cases it may be desirable to heat the peat preliminarily—that is to say, before entering the mouthpiece.

For this purpose also the intermediate piece 28 is furnished with a jacket 29, communicating with pipes 30 and 31, so that also in this case steam, hot air, or hot water may be conducted through the jacket 29. The temperature of the heating medium is preferably so determined with respect to the speed of the peat-bar that the heat penetrates only from two or three millimeters into the bar, so that the interior portion of the same remains cold and wet, whereas the exterior portions assume a temperature of about 60° centigrade. Now when the hot bar leaves the mouthpiece the water present in the heated exterior portions of the bar evaporates quickly, and said portions obtain thus a certain degree of dryness which may be promoted by letting the peat bar pass from the mouthpiece immediately into a channel through which hot air or the like is conducted, either in the same direction as the bar moves or contrarily thereto. The peat bar when leaving the mouthpiece is deposited upon boards 32, which are supported by rolls 33 and are moved longitudinally upon and over the rolls, according to the speed of motion of the bar. Generally the boards 32 are displaced by hand one after the other, so that each fresh board shoves the preceding ones farther along upon the rolls and to and below the bar or bars of peat. I prefer to employ boards having a length of about one meter and a breadth of forty centimeters, so that three or four bars of peat may be located side by side upon these boards. In fact, I prefer to produce three or four bars of peat at a time by means of the same mouthpiece which, of course, must be correspondingly constructed, preferably in such a manner that the peat bars are separated from each other not throughout their entire height, but, say, for about three-fourths or four-fifths, as shown at 27 in Fig. 1. In order to prevent the bars from sticking to the boards, these latter are provided with a layer of small particles of dry materials, such as peat-dust, dust-coal, or sawdust. This may be brought about mechanically by arranging in front of the machine and above the boards a reservoir 34, containing the material to be distributed over and upon the boards and provided for this purpose with a suitable device—for instance, such as indicated at 39. The thus-prepared boards are introduced below the peat bars, which thus rest upon the said dry particles. Another reservoir, 35, is arranged behind the machine, or, more precisely, behind the mouthpiece, and is also provided with a distributing device— for instance, such as indicated at 40. The particles are distributed by this device not only upon the upper surfaces of the peat bars, but upon the lateral surfaces also, so that said particles get also into the small spaces existing between two neighboring bars. In order to be able to make the particles better adhere to the said surfaces, I have provided a horizontal plate 36 and vertical plates 37, located in front of the plate 36. The plates 37 have a sharp front edge and a blunt rear edge, so that the particles adhering to the sides of the bars are somewhat pressed into these sides while passing the plates 37—i.e., while moving from the sharp front edge to the blunt rear edge of the same. When then the thus-treated bars have passed the plate 36, they are cut into sods in a known manner and by known means, and the sods are then taken off the boards and piled up. In case the peat forming the sods is, perhaps, very fat, and poor in fibers, it is easily acted on by the sun, by wind, or rain, the result being that the sods get rents and clefts. Also this drawback is practically completely overcome by the kind of skin or crust formed by the small dry particles with which the bars have been provided prior to being cut, as before described.

Having now described my invention, what I desire to secure by Letters Patent of the United States is—

1. In a peat-compressing machine, the combination of a feed-hopper, bow-shaped means arranged in said hopper for separating portions of peat from the peat mass fed into the hopper, and means for kneading and compressing the peat.

2. In a peat-compressing machine, the combination, with a feed-hopper, means arranged in said hopper for separating portions of peat from the peat mass fed into the hopper and for scraping the peat from the walls of the hopper, and means for kneading and compressing the peat and transforming it into bars.

3. In a peat-compressing machine, the combination of a feed-hopper, rotary bow-shaped means arranged in said hopper for separating portions of peat from the peat mass fed therein, and means for kneading and compressing the peat.

4. In a peat-compressing machine, the combination of a feed-hopper, a shaft extending therethrough and having a deflected portion forming a scraper for separating portions of peat from the peat mass fed therein and for removing the peat from the walls of the hopper, and means for kneading and compressing the peat.

5. In a peat-compressing machine, the combination, with a feed-hopper, of a plurality of rotary shafts extending through the hopper at different heights and provided with deflected portions for scraping the peat from the walls of the hopper, and means for kneading and compressing the peat and shaping it into bars.

6. In a peat-compressing machine, the combination, with a feed-hopper, crooked shafts located in the feed-hopper and adapted to scrape the peat off the walls of the same, pointed projections provided upon said crooked shafts, and means for kneading and compressing the peat and shaping it to bars.

7. In a peat-compressing machine, the combination, with a feed-hopper, means arranged in said feed-hopper and adapted to remove the peat from its walls, means for kneading the peat, a nose-roller located between said two means and adapted to transport the peat from the means first mentioned to the other one, and means for compressing the peat and turning it into bars.

8. In a peat-compressing machine, the combination, with a feed-hopper, two crooked shafts adapted to rotate in opposite directions and located the one in the upper and the other in the lower portion of the feed-hopper, a nose-roller located in proximity to the lower crooked shaft and adapted to be rotated in a direction opposite to that of this shaft, and means for kneading and compressing the peat and transforming it into bars.

9. In a peat-compressing machine, the combination, with a feed-hopper, a cylinder communicating with said feed-hopper, a shaft extending longitudinally through said cylinder, knives secured to said shaft, bars extending across the cylinder and arranged so as to allow of the knives rotating between them, and means for compressing the peat and turning it into bars.

10. In a peat-compressing machine, the combination, with a feed-hopper, a cylinder communicating with the hopper, a shaft extending longitudinally through said cylinder, knives secured to said shaft, bars extending across the cylinder and taking into grooves provided in the hubs of said knives, and means for compressing the peat and transforming it into bars.

11. In a peat-compressing machine, the combination, with a feed-hopper, a cylinder communicating with said feed-hopper, a shaft extending longitudinally through the same, knives and wings attached to said shaft, means for regulating the pressure of the peat before entering the said cylinder, and means for turning the peat into bars.

12. In a peat-compressing machine, the combination, with a feed-hopper, a cylinder communicating with said hopper, a nose-roller located between the hopper and said cylinder, rotary disks taken from the outside of the machine between the noses of said roller and adapted to give way, means for supporting said disks, and means for kneading and compressing the peat and turning it into bars.

13. In a peat-compressing machine, the combination, with a feed-hopper, a cylinder communicating with said feed-hopper, a nose-roller located between the hopper and said cylinder, an aperture provided in the wall of the casing of the machine near to said roller, rotary disks taking from the outside of the machine through said aperture between the noses of the said roller, means for supporting said disks and adapted to give way, and means for kneading and compressing the peat and transforming it into bars.

14. In a peat-compressing machine, the combination, with a feed-hopper, a cylinder communicating with said hopper, a nose-roller located between the hopper and said cylinder, rotary disks adapted to give way and taking between the noses of said roller from the outer side of the machine, means for supporting said disks, means for removing from them the peat carried by them from the inner space to the outside of the machine, and means for kneading and compressing the peat and transforming it into bars.

In witness whereof I have hereunto set my my hand in presence of two witnesses.

CARL SCHLICKEYSEN.

Witnesses:
 WOLDEMAR HAUPT,
 HENRY HASPER.